United States Patent [19]

Ohtake

[11] Patent Number: 5,654,829
[45] Date of Patent: Aug. 5, 1997

[54] ZOOM LENS

[75] Inventor: Motoyuki Ohtake, Ohmiya, Japan

[73] Assignee: Nikon Corporation, Tokyo, Japan

[21] Appl. No.: 488,914

[22] Filed: Jun. 9, 1995

[30] Foreign Application Priority Data

Jul. 29, 1994 [JP] Japan .................................. 6-197234

[51] Int. Cl.$^6$ .................................................. G02B 15/14
[52] U.S. Cl. .......................................... 359/686; 359/684
[58] Field of Search ............................... 359/684, 686, 359/693

[56] References Cited

U.S. PATENT DOCUMENTS 4,702,567  10/1987  Kato et al. ............................. 359/684
4,787,719  11/1988  Imai ....................................... 359/693
5,483,380   1/1996  Nozawa ................................. 359/684

*Primary Examiner*—Bruce Anderson
*Attorney, Agent, or Firm*—Shapiro and Shapiro

[57] ABSTRACT

In a zoom lens composed of at least a first lens unit G1, a second lens unit G2 and a third lens unit G3 in that order from an object side, a variable magnification-focusing lens unit GF disposed nearer to an image side than the first lens unit is shifted along an optical axis to perform a refractive power varying operation from a wide-angle end to a telephoto end and a focusing operation to a near distance object, and an air gap along the optical axis between the variable magnification-focusing lens unit GF and a lens unit GE adjacent to the variable magnification-focusing lens unit GF is approximately constant at a predetermined photographing distance without depending on variation in effective focal length of the entire lens system.

5 Claims, 16 Drawing Sheets

1

ZOOM LENS

BACKGROUND OF THE INVENTION

1. Field of the Invention

The present invention relates to a zoom lens and more particularly to a zoom lens with great zoom ratio.

2. Related Background Art

Zoom lenses are going mainstream as photographing systems used for still cameras and video cameras. Also, cameras incorporated with an autofocus function are going mainstream.

Particularly, as technology on lens barrels has advanced in recent years, various zoom lenses in which the zoom ratio is increased by the use of a so-called multiple zoom lens with more than three movable lens units have been proposed.

Generally, in multiple zoom lenses, since the degrees of freedom in the selection of locus of each lens unit increase during moving of the lens units from a wide-angle end to a telephoto end, the degrees of freedom in aberration correction increase. Also, the number of lens units burdened with the refractive power varying operation increases, so that it is possible to aim at equalizing the burdens of the lens units in the refractive power varying operation, resulting in achievement of high zoom ratio and high performance.

In almost all the zoom lenses used for the above-mentioned cameras, focusing on a near distance object is performed by shifting one or a few lens units along the optical axis among the lens units to be shifted along the optical axis in the refractive power varying operation, i.e., movable variable refractive power lens units. Also, in order to achieve miniaturization of the lens system and simplicity of the drive mechanism of the focusing lens unit, the focusing lens unit is needed to be lightweight and its shift amount in the near distance focusing is required to be small generally.

For example, in a so-called four-unit focal zoom lens, near distance focusing is performed by means of a first lens unit disposed nearest to an object, and its entire lens length is not varied in a refractive power varying operation. That is, the amount of shift of the first lens unit as the focusing lens unit is constant without depending on variation in effective focal length. However, the first lens group has a larger diameter than the other lens units. Therefore, when aiming at miniaturizing the lens system, the first lens unit is not suitable for the focusing lens unit.

Alternately, there are a rear focus (RF) method and an inner focus (IF) method, wherein near distance focusing is performed by shifting a lens unit disposed nearer to an image surface than a first lens unit. When these methods are adopted, a lens unit with a small diameter can be selected as the focusing lens unit, which therefore is suitable for achieving miniaturization of the lens system.

However, in the rear focus (RF) method or the inner focus (IF) method, the amount of shift of the focusing lens unit is determined depending on both variation in photographing distance and variation in effective focal length of the lens system. That is, even at the same photographing distance, the amount of shift of the focusing lens unit is varied depending on variation in effective focal length.

The amount of shift of the focusing lens unit constituting a portion of the movable variable refractive lens units is expressed by the sum of an amount of shift due to its refractive power varying operation and an amount of shift due to its near distance focusing operation. Thus, when the focusing lens unit is a variable magnification-focusing lens unit to be shifted both in the refractive power varying operation and in the focusing operation, it is difficult to perform drive control of the variable magnification-focusing lens unit by shifting the lens unit along a cam groove in response to rotational movement of the lens barrel, i.e., by utilizing a mechanically-driven cam.

Hence, there is an increase in the number of zoom lenses in which the shift of a variable magnification power-focusing lens unit due to a refractive power varying operation and the shift thereof due to a near distance focusing operation are controlled electrically simultaneously by supplying an electric signal corresponding to the amount of shift of the lens unit to shift the lens unit a predetermined amount by means of a stepping motor and a rotating screw i.e., by utilizing an electrically-driven cam.

However, in such conventional zoom lenses, at the time of the manufacture, inconvenience occurs in that a back focus of the lens system needs to be adjusted while moving the variable magnification-focusing lens unit electrically.

SUMMARY OF THE INVENTION

In view of the foregoing problems, it is an object of the present invention to provide a zoom lens in which a back focus of the lens system can be adjusted easily even though a variable magnification power-focusing lens unit to be shifted both in a refractive power varying operation and in a focusing operation is incorporated therein.

In order to solve the above problems, a zoom lens according to the present invention is composed of, in order from an object side, at least a first lens unit G1, a second lens unit G2 and a third lens unit G3, wherein a variable magnification-focusing lens unit GF arranged closer to an image side than the first lens unit is shifted along an optical axis to perform a refractive power varying operation from a wide-angle end to a telephoto end and a focusing operation to a near distance object, and an air gap along the optical axis between the variable magnification-focusing lens unit GF and a lens unit GE adjacent to the variable magnification-focusing lens unit GF is approximately constant at a predetermined photographing distance without depending on variation in effective focal length of the entire lens system.

In a preferred embodiment, the direction of relative movement of the variable magnification-focusing lens unit GF with respect to the adjacent lens unit GE in the refractive power varying operation from the wide-angle end to the telephoto end is contrary to the direction of relative movement of the variable magnification-focusing lens unit GF with respect to the adjacent lens unit GE in the focusing operation to the near distance object.

According to the present invention, in the zoom lens having at least more than three movable lens units, i.e., the first lens unit G1, the second lens unit G2, the third lens unit G3 . . . in that order from the object side, the variable magnification-focusing lens unit GF arranged nearer to the image side than the first lens unit G1 is shifted along the optical axis both in the refractive power varying operation and in the focusing operation. Also, the air gap D along the optical axis between the variable magnification-focusing lens unit GF and the lens unit GE disposed on the object side or the image side of the variable magnification-focusing lens unit GF is approximately constant with respect to the predetermined photographing distance in the refractive power varying operation without depending on variation in effective focal length of the entire lens system.

More specifically, for example, it is preferable to provide first shifting means for shifting the variable magnification-focusing lens unit GF and the adjacent lens unit GE in one piece, and second shifting means for shifting the variable magnification-focusing lens GF relative to the adjacent lens unit GE. In this case, the first shifting means shifts the variable magnification-focusing lens unit GF and the adjacent lens unit GE in one piece mechanically along a cam groove in response to rotational movement of a cam of a lens barrel. The second shifting means shifts the variable magnification-focusing lens unit GF a predetermined amount corresponding to an effective focal length and a photographing distance via an electric signal.

As mentioned above, the air gap D along the optical axis at the predetermined photographing distance R is always approximately constant during the refractive power varying operation. Therefore, it is possible to easily adjust the back focus of the lens system by adjusting an image surface position to be approximately constant from the wide-angle end to the telephoto end while shifting the variable magnification-focusing lens unit GF and the adjacent lens unit GE in one piece with the state of the photographing distance R as a reference state.

Also, in the present invention, in order to achieve miniaturization of the lens system and effective utilization of a space, it is desirable to set the direction of variation in air gap D along the optical axis during the refractive power varying operation from the wide-angle end to the telephoto end to be contrary to the direction of variation in air gap D along the optical axis during the focusing operation from a far distance object to a near distance object.

Further, according to the present invention, in order to aim at reducing the amount of shift of the variable magnification-focusing lens unit GF in the refractive power varying operation and in the focusing operation and simplifying the drive means for shifting the variable magnification-focusing lens unit GF, as the effective focal length is varied from the wide-angle end to the telephoto end, it is preferable to make the amount of forward shift of the variable magnification-focusing lens unit GF ranging from an infinity photographing distance condition to a nearest photographing distance condition increase monotonously. Also, when performing the refractive power varying operation from the wide-angle end to the telephoto end in the infinity photographing distance condition and in the nearest photographing distance condition, it is preferable to make the air gap D along the optical axis vary monotonously.

When brightness is constant from the wide-angle end to the telephoto end, the depth of field becomes shallow as the effective focal length is varied from the wide-angle end to the telephoto end. For this reason, for example, if the amount of forward shift of the variable magnification-focusing lens unit GF is the same in the closest photographing distance without depending on variation in effective focal length, lens position accuracy of the variable magnification-focusing lens unit GF is strictly required as the effective focal length is varied from the wide-angle end to the telephoto end.

Therefore, in the refractive power varying operation from the wide-angle end to the telephoto end, when the amount of forward shift of the variable magnification-focusing lens unit GF increases monotonously, the lens position of the variable magnification-focusing lens unit GF can be controlled preferably.

The above and other objects, features and advantages of the present invention are explained hereinafter and may be better understood by reference to the drawings and the descriptive matter which follows.

DETAILED DESCRIPTION OF THE PREFERRED EMBODIMENTS

Embodiments of the present invention will be hereinafter described with reference to the accompanying drawings.

[First Embodiment]

Figure 1:
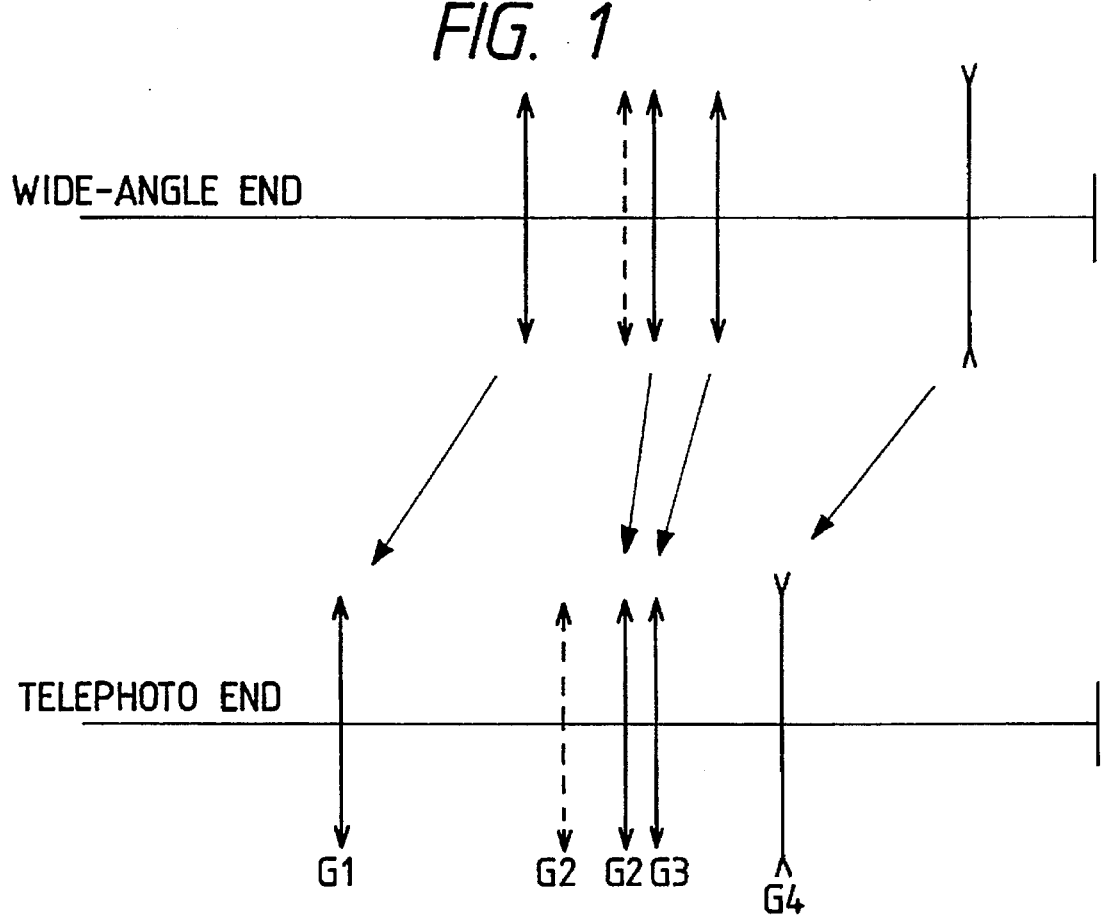
FIG. 1 shows the arrangement of refractive powers of a zoom lens according to a first embodiment of the present invention.

FIG. 1 shows the arrangement of refractive powers of a zoom lens according to a first embodiment of the present invention.

The zoom lens is composed of, in order from an object side, a first lens unit G1 having a positive refractive power, a second lens unit G2 having a positive refractive power, a third lens unit G3 having a positive refractive power and a fourth lens unit G4 having a negative refractive power.

When moving the lens units from a wide-angle end to a telephoto end, the lens units are moved toward the object side such that an air gap between the first lens unit G1 and the second lens unit G2 is increased, an air gap between the second lens unit G2 and the third lens unit G3 is decreased, and an air gap between the third lens unit G3 and the fourth lens unit G4 is decreased. Also, when focusing from a far distance object to a near distance object, the second lens unit G2 is moved toward the object side.

In FIG. 1, the positions of the second lens unit G2 indicated by solid lines correspond to an infinity focusing condition and the positions of the second lens unit G2 indicated by broken lines correspond to a photographing distance R.

Figure 2:
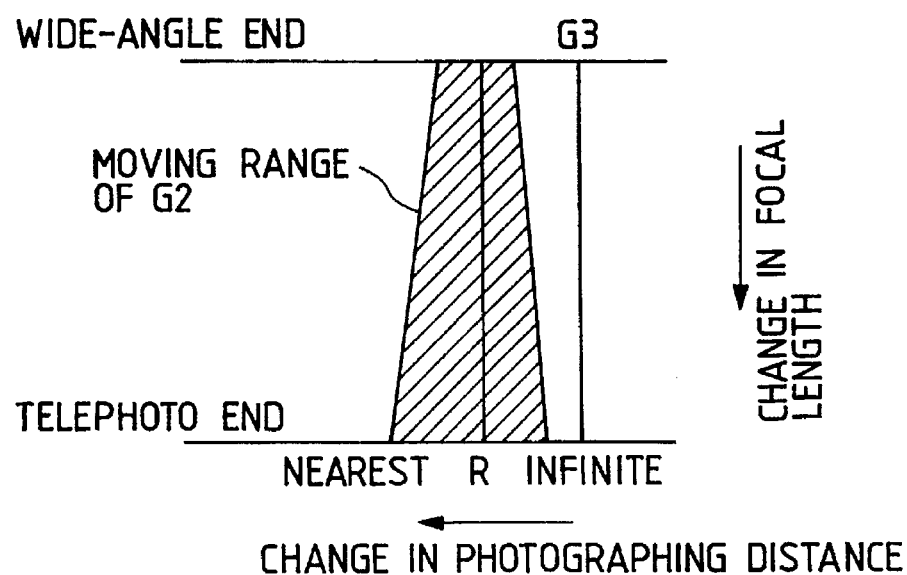
FIG. 2 shows a relative positional relationship between the second lens unit G2 as a variable magnification-focusing lens unit in the first embodiment and the third lens unit G3 as an adjacent lens unit.

FIG. 2 shows a relative positional relationship between the second lens unit G2 as a variable magnification-focusing lens unit and the third lens unit G3 as an adjacent lens unit. In FIG. 2, the second lens unit G2 is moved in a range indicated by oblique hatching in accordance with variation in effective focal length from the wide-angle end to the telephoto end and variation in photographing distance from infinity to a nearest distance.

Figure 3:
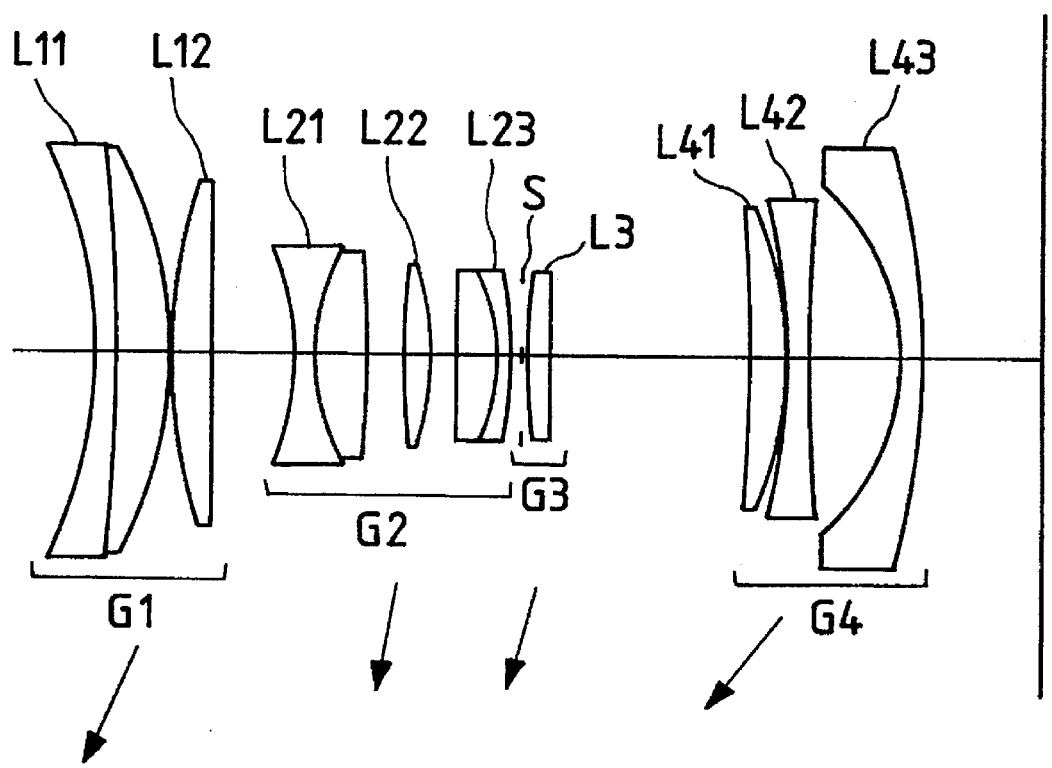
FIG. 3 shows the structure of the zoom lens according to the first embodiment of the present invention.

FIG. 3 shows the structure of the zoom lens according to the first embodiment of the present invention.

In order from the object side, the first lens unit G1 is composed of a positive joint lens L11 consisting of a negative meniscus lens having a concave surface facing the object side and a positive meniscus lens having a concave surface facing the object side, and a double convex lens L12. The second lens unit G2 is composed of a joint lens L21 consisting of a double concave lens and a double convex lens, a double convex lens L22, and a joint lens L23 consisting of a double convex lens and a negative meniscus lens having a concave surface facing the object side. The third lens unit G3 is a double convex lens L3. The fourth lens unit G4 is composed of a positive meniscus lens L41 having a concave surface facing the object side, a double concave lens L42 and a negative meniscus lens L43 having a concave surface facing the object side.

Also, a stop S is disposed between the second lens unit G2 and the third lens unit G3, and is moved with the third lens unit G3 in one piece in a refractive power varying operation from the wide-angle end to the telephoto end.

FIG. 3 shows the positional relationship between the lens units at the wide-angle end, and they are moved on the optical axis along zoom loci indicated by arrows in FIG. 1 in a refractive power varying operation from the wide-angle end to the telephoto end.

Table 1 shows data as to the first embodiment. In the Table 1, f is the effective focal length; FN is the F-number; 2ω is the angle of field; and Bf is the back focus. Further, surface numbers show the order of lens surfaces from the object side. Refractive indexes and Abbe numbers are values with respect to d-line (λ=587.6 nm).

TABLE 1 f = 39.05 to 60.06 to 102.05 mm
FN = 4.2 to 5.8 to 8.5
2ω = 57.8 to 38.8 to 23.6°

| Surface Number | Radius of Curvature | Intersurface Distance | Abbe's Number | Refractive Index |
|---|---|---|---|---|
| 1 | −29.3519 | 1.40 | 33.89 | 1.80384 |
| 2 | −124.8342 | 3.60 | 69.98 | 1.51860 |
| 3 | −25.8573 | 0.20 | | |
| 4 | 39.5330 | 2.80 | 65.42 | 1.60300 |

TABLE 1-continued

| 5 | −319.0038 | (d5 = Variable) | | |
|---|---|---|---|---|
| 6 | −16.7721 | 1.20 | 37.03 | 1.81474 |
| 7 | 12.7405 | 3.50 | 23.01 | 1.86074 |
| 8 | −104.5711 | 2.60 | | |
| 9 | 87.8947 | 1.80 | 58.90 | 1.51823 |
| 10 | −19.1424 | 1.60 | | |
| 11 | 515.8550 | 2.90 | 61.09 | 1.63041 |
| 12 | −11.2833 | 1.00 | 23.01 | 1.86074 |
| 13 | −25.8746 | (d13 = Variable) | | |
| 14 | ∞ | 0.50 | (Stop S) | |
| 15 | 163.5032 | 1.40 | 58.90 | 1.51823 |
| 16 | −282.2872 | (d16 = Variable) | | |
| 17 | −131.7640 | 2.60 | 25.35 | 1.80518 |
| 18 | −22.8200 | 0.11 | | |
| 19 | −31.2945 | 1.40 | 49.45 | 1.77279 |
| 20 | 98.8684 | 6.09 | | |
| 21 | −14.5972 | 1.40 | 53.93 | 1.71300 |
| 22 | −56.4361 | (Bf) | | |

(VARIABLE SPATIAL DISTANCE IN REFRACTIVE POWER VARYING OPERATION)

| f | 39.0516 | 65.0625 | 102.0547 |
|---|---|---|---|
| d5 | 5.5791 | 11.2002 | 18.4707 |
| d13 | 0.5542 | 0.4263 | 0.1934 |
| d16 | 13.4281 | 7.1358 | 1.3990 |
| Bf | 8.0683 | 23.1121 | 50.1187 |

(VARIABLE SPATIAL DISTANCE IN 2 m PHOTOGRAPHING DISTANCE)

| f | 39.0516 | 65.0625 | 102.0547 |
|---|---|---|---|
| d5 | 4.8707 | 10.3638 | 17.4014 |
| d13 | 1.2626 | 1.2627 | 1.2628 |
| d16 | 13.4281 | 7.1358 | 1.3990 |
| Bf | 8.0683 | 23.1121 | 50.1187 |

Referring to the variable spatial distance at the 2 m photographing distance in the Table 1, it is known that the air gap d13 along the optical axis between the second lens unit G2 as the variable magnification-focusing lens unit and the third lens unit G3 as the adjacent lens unit is approximately constant with respect to the predetermined photographing distance of 2 m without depending on variation in effective focal length of the entire lens system. Therefore, in the zoom lens of this embodiment, the adjustment of the back focus of the lens system can be easily performed by adjusting an image surface position so as to be approximately constant from the wide-angle end to the telephoto end at the 2 m photographing distance.

Figure 4:
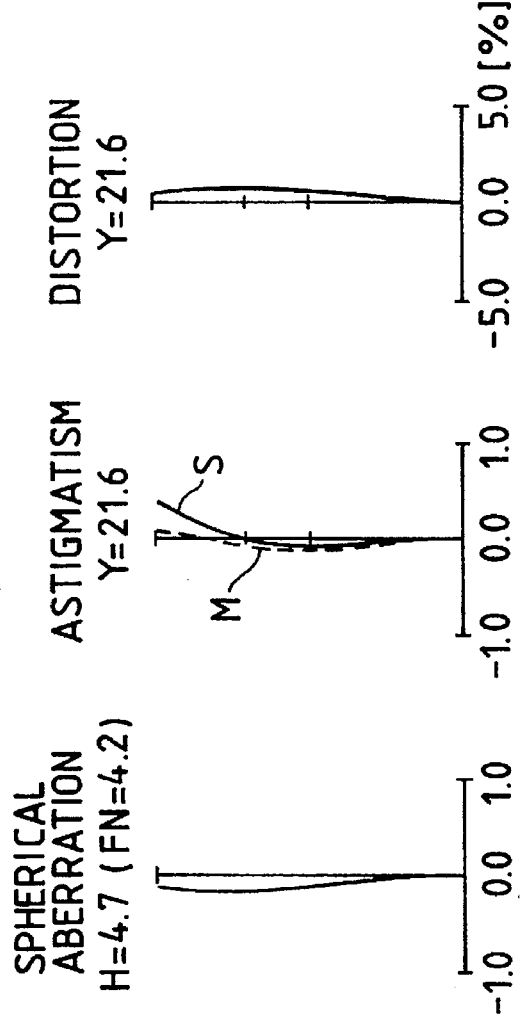
FIG. 4 shows various aberration curves at a wide-angle end (shortest focal length condition) in an infinity focusing condition in the first embodiment.
Figure 5:
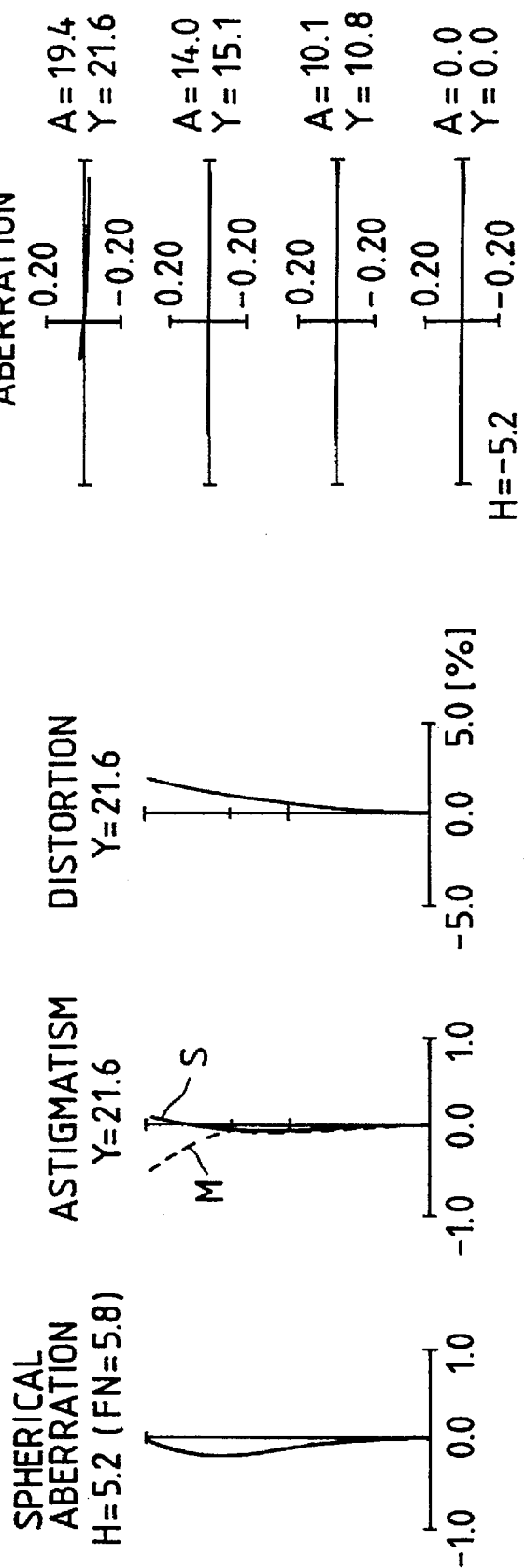
FIG. 5 shows various aberration curves in an intermediate focal length condition in an infinity focusing condition in the first embodiment.
Figure 6:
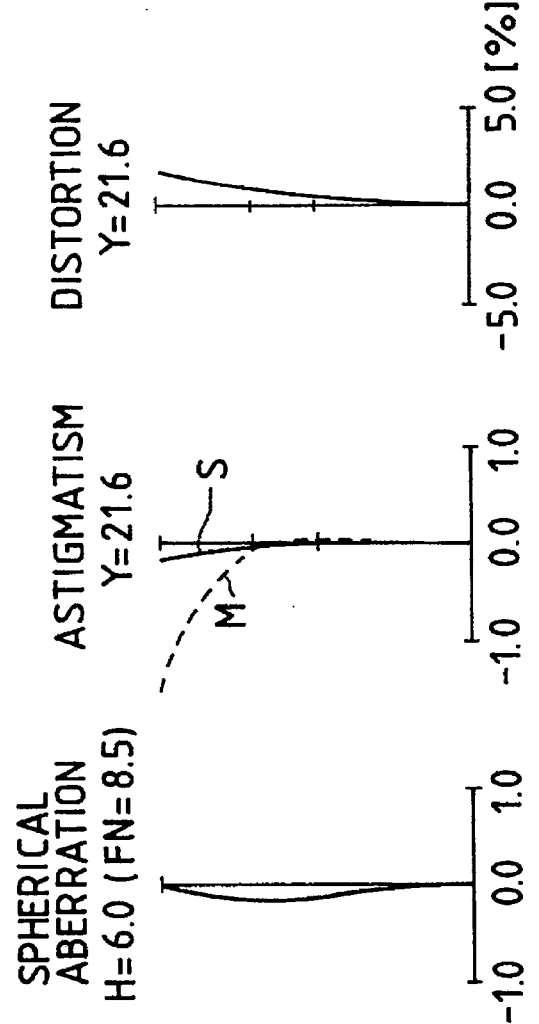
FIG. 6 shows various aberration curves at a telephoto end (longest focal length condition) in an infinity focusing condition in the first embodiment.

FIGS. 4 to 9 show various aberration curves of the first embodiment. FIG. 4 shows various aberration curves at the wide-angle end (shortest focal length condition) in an infinity focusing condition. FIG. 5 shows various aberration curves in an intermediate focal length condition in an infinity focusing condition. FIG. 6 shows various aberration curves at the telephoto end (longest focal length condition) in an infinity focusing condition.

Figure 7:
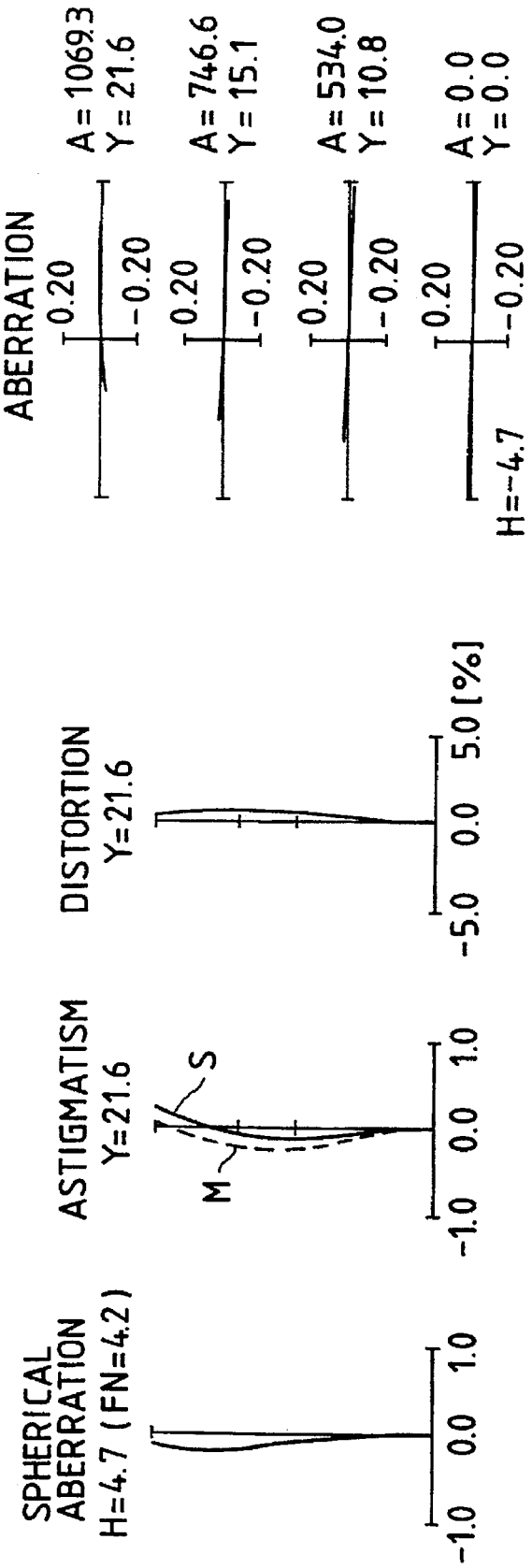
FIG. 7 shows various aberration curves at the wide-angle end in a 2 m photographing distance focusing condition in the first embodiment.
Figure 8:
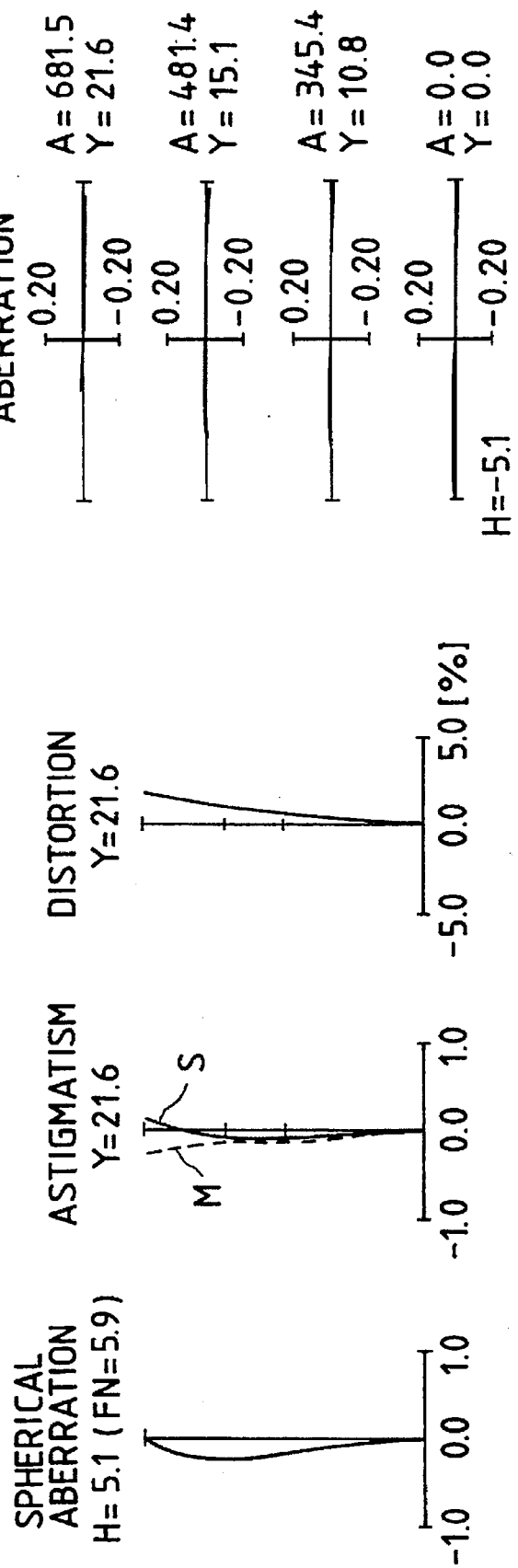
FIG. 8 shows various aberration curves in the intermediate focal length condition in a 2 m photographing distance focusing condition in the first embodiment.
Figure 9:
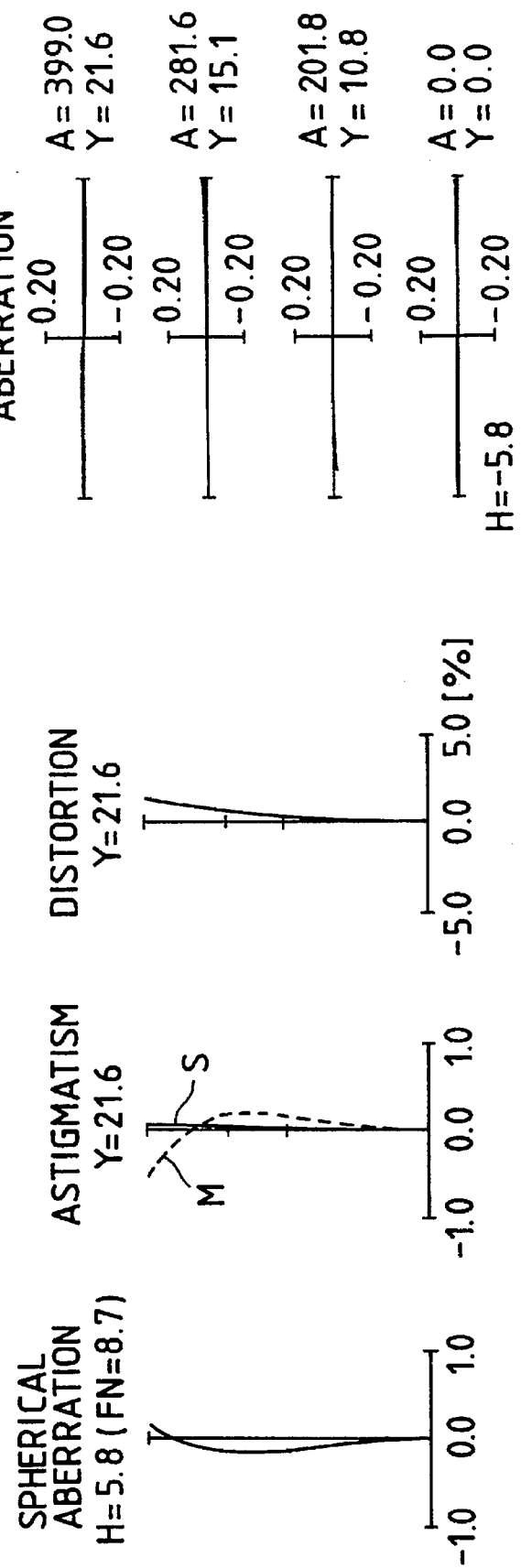
FIG. 9 shows various aberration curves at the telephoto end in a 2 m photographing distance focusing condition in the first embodiment.

FIG. 7 shows various aberration curves at the wide-angle end in a 2 m photographing distance focusing condition. FIG. 8 shows various aberration curves in the intermediate focal length condition in a 2 m photographing distance focusing condition. FIG. 9 shows various aberration curves at the telephoto end in a 2 m photographing distance focusing condition.

In the aberration curves, FN represents the F-number; H represents the height of incident light; Y represents the height of the image; and A represents the angle of incidence of the principle ray.

Also, in the aberration curves indicating astigmatism, the solid line is the sagittal image surface S and the broken line is the meridional image surface M.

As is apparent from the aberration curves, in this embodiment, various aberrations in the respective focal length conditions are corrected preferably.

[Second Embodiment]

Figure 10:
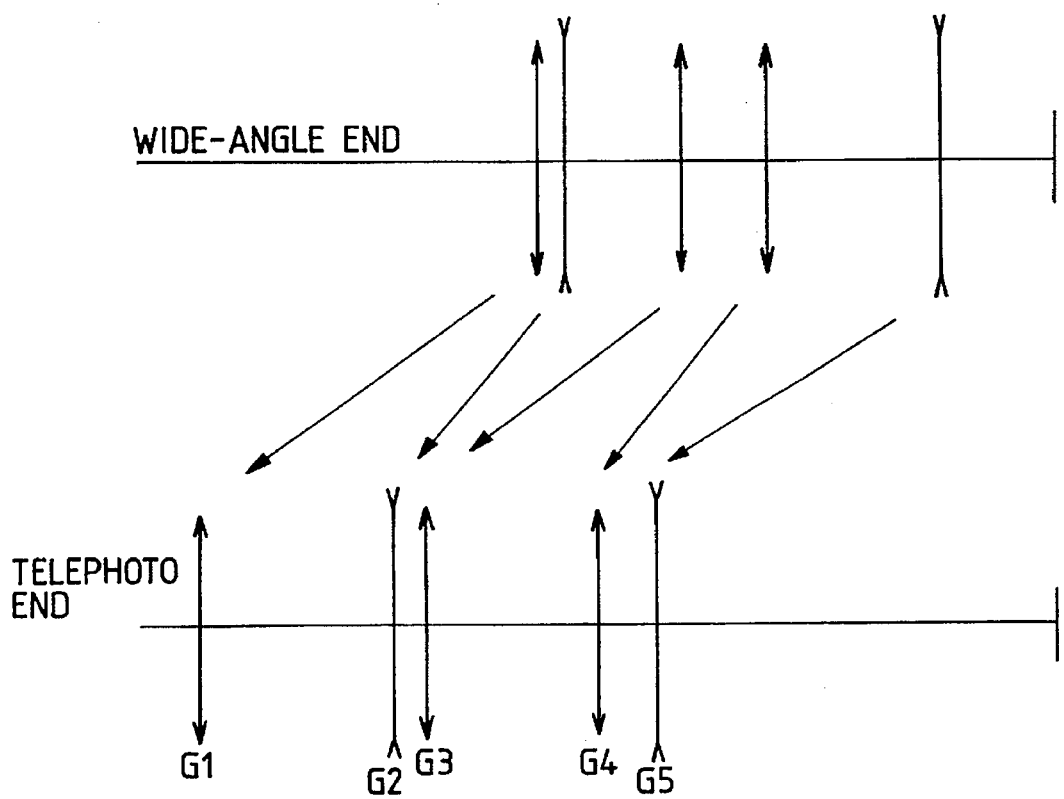
FIG. 10 shows the arrangement of refractive powers of a zoom lens according to a second embodiment of the present invention.

FIG. 10 shows the arrangement of refractive powers of a zoom lens according to a second embodiment of the present invention.

The zoom lens is composed of, in order from an object side, a first lens unit G1 having a positive refractive power, a second lens unit G2 having a negative refractive power, a third lens unit G3 having a positive refractive power, a fourth lens unit G4 having a positive refractive power and a fifth lens unit G5 having a negative refractive power. When moving the lens units from a wide-angle end to a telephoto end, the lens units are moved toward the object side such that an air gap between the first lens unit G1 and the second lens unit G2 is increased, an air gap between the second lens unit G2 and the third lens unit G3 is decreased, an air gap between the third lens unit G3 and the fourth lens unit G4 is increased, and an air gap between the fourth lens unit G4 and the fifth lens unit G5 is decreased.

When moving the lens units, the first lens unit G1 and the fifth lens unit G5 are moved in one piece and the second lens unit G2 and the fourth lens unit G4 are moved in one piece at respectively different speeds.

Also, when focusing from a far distance object to a near distance object, the third lens unit G3 is moved toward an image side.

Figure 11:
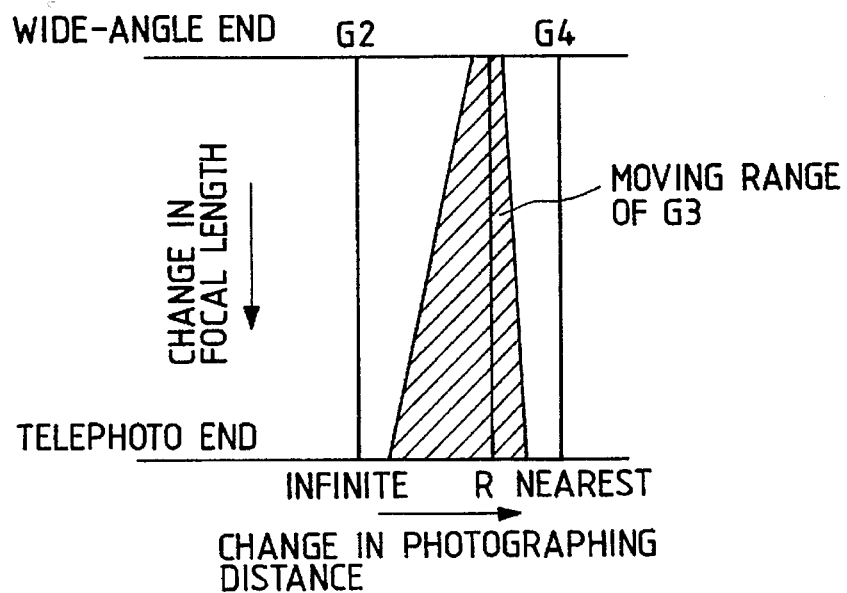
FIG. 11 shows a relative positional relationship between the third lens unit G3 as a variable refractive power lens unit of the second embodiment and the second and fourth lens units G2, G4 adjacent to the third lens unit G3.

FIG. 11 shows a relative positional relationship between the third lens unit G3 as a variable magnification-focusing lens unit and the second lens unit G2 and the fourth lens unit G4 adjacent to the third lens unit G3. In FIG. 11, the third lens unit G3 is moved in a range indicated by oblique hatching in accordance with variation in effective focal length from the wide-angle end to the telephoto end and variation in photographing distance from infinity to a nearest distance.

Figure 12:
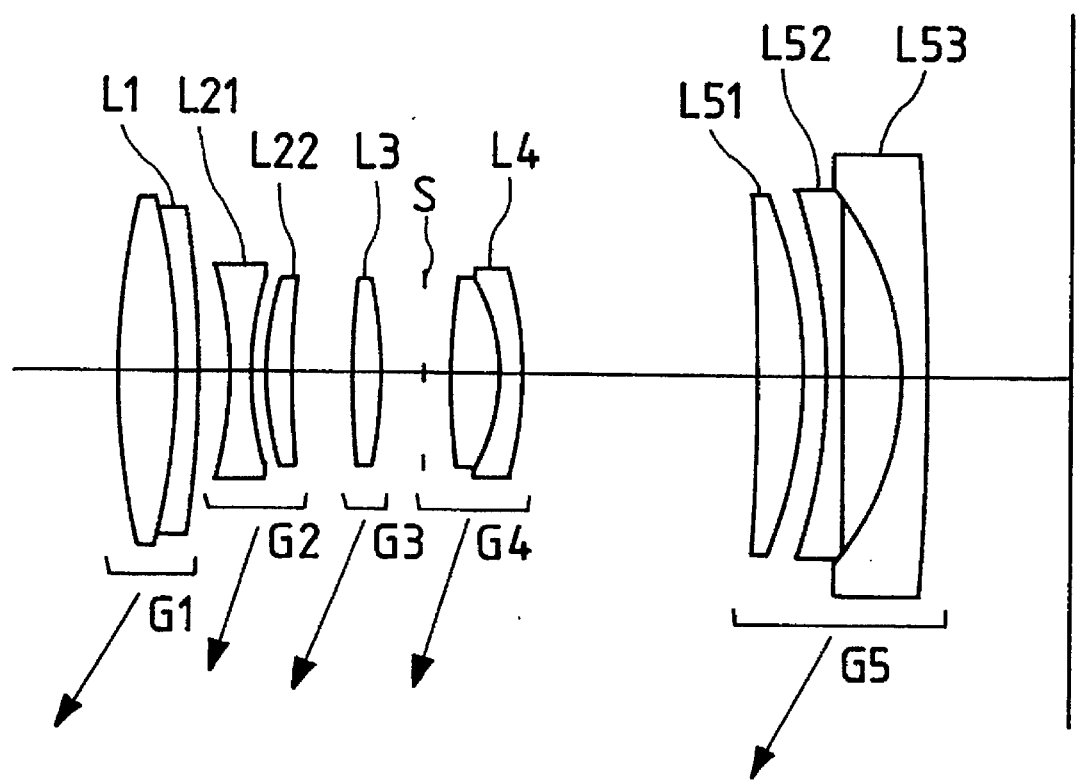
FIG. 12 shows the structure of the zoom lens according to the second embodiment of the present invention.

FIG. 12 shows the structure of the zoom lens according to the second embodiment of the present invention.

In the order from the object side, the first lens unit G1 is composed of a positive joint lens L1 consisting of a double convex lens and a negative meniscus lens having a concave surface facing the object side. The second lens unit G2 is composed of a double concave lens L21 and a positive meniscus lens L22 having a convex surface facing the object side. The third lens unit G3 is a double convex lens L3. The fourth lens unit G4 is composed of a joint lens L4 consisting of a double convex lens and a negative meniscus lens having a concave surface facing the object side. The fifth lens unit G5 is composed of a positive meniscus lens L51 having a concave surface facing the object side, a negative meniscus lens L52 having a concave surface facing the object side, and a negative meniscus lens L53 having a concave surface facing the object side.

Also, a stop S is disposed between the third lens unit G3 and the fourth lens unit G4, and is moved with the fourth lens unit G4 in one piece in a refractive power varying operation from the wide-angle end to the telephoto end.

FIG. 12 shows a positional relationship of the lens units at the wide-angle end, and they are moved on the optical axis along the zoom loci indicated by arrows in FIG. 10 in the refractive power varying operation from the wide-angle end to the telephoto end.

Table 2 shows data as to the second embodiment. In the Table 2, f is the effective focal length; FN is the F-number; 2ω is the angle of field; and Bf is the back focus. Further, surface numbers show the order of lens surfaces from the object side. Refractive indexes and Abbe numbers are values with respect to d-line (λ=587.6 nm).

TABLE 2 f = 38.81 to 75.35 to 110.52 mm
FN = 4.1 to 6.2 to 8.2
2ω = 58.6 to 31.0 to 21.6°

| Surface Number | Radius of Curvature | Intersurface Distance | Abbe's Number | Refractive Index |
| --- | --- | --- | --- | --- |
| 1 | 45.0525 | 3.89 | 69.98 | 1.51860 |
| 2 | −38.2984 | 1.38 | 23.01 | 1.86074 |
| 3 | −67.7399 | (d3 = Variable) | | |
| 4 | −21.1121 | 1.26 | 52.30 | 1.74810 |
| 5 | 18.7929 | 0.88 | | |
| 6 | 18.5014 | 1.88 | 23.01 | 1.86074 |
| 7 | 57.8271 | (d7 = Variable) | | |
| 8 | 107.9504 | 1.76 | 69.98 | 1.51860 |
| 9 | −25.8610 | (d9 = Variable) | | |
| 10 | ∞ | 1.88 | (Stop S) | |
| 11 | 40.0922 | 3.27 | 69.98 | 1.51860 |
| 12 | −10.7240 | 1.51 | 25.35 | 1.80518 |
| 13 | −19.5245 | (d13 = Variable) | | |
| 14 | −149.4337 | 2.89 | 25.35 | 1.80518 |
| 15 | −26.0698 | 1.63 | | |
| 16 | −32.9870 | 1.38 | 43.35 | 1.84042 |
| 17 | −169.9714 | 3.77 | | |
| 18 | −16.6274 | 1.51 | 49.45 | 1.77279 |
| 19 | −294.9845 | (Bf) | | |

(VARIABLE SPATIAL DISTANCE IN REFRACTIVE POWER VARYING OPERATION)

| f | 38.8095 | 75.3488 | 110.5161 |
| --- | --- | --- | --- |
| d3 | 2.0894 | 12.0857 | 16.2726 |
| d7 | 4.0239 | 2.6978 | 1.5123 |
| d9 | 2.7541 | 4.0802 | 5.2657 |
| d13 | 15.3352 | 5.3390 | 1.1521 |
| Bf | 9.5997 | 32.4714 | 52.0738 |

(VARIABLE SPATIAL DISTANCE IN 1.15 m PHOTOGRAPHING DISTANCE)

| f | 38.8095 | 75.3488 | 110.5161 |
| --- | --- | --- | --- |
| β | −0.0340 | −0.0642 | −0.0924 |
| d0 | 1087.1876 | 1064.3159 | 1044.7134 |
| d3 | 2.0894 | 12.0857 | 16.2726 |
| d7 | 5.5351 | 5.5351 | 5.5351 |
| d9 | 1.2429 | 1.2429 | 1.2429 |
| d13 | 15.3352 | 5.3390 | 1.1521 |
| Bf | 9.5997 | 32.4714 | 52.0738 |

Referring to the variable spatial distance at the 1.15 m photographing distance in the Table 2, it is known that the air gap d7 along the optical axis between the third lens unit G3 as the variable magnification-focusing lens unit and the second lens unit G2 as the adjacent lens unit is approximately constant with respect to the predetermined photographing distance of 1.15 m without depending on variation in effective, focal length of the entire lens system.

Furthermore, it is known that the air gap d9 along the optical axis between the third lens unit G3 as the variable magnification-focusing lens unit and the fourth lens unit G4 as the adjacent lens unit is approximately constant with respect to the predetermined photographing distance of 1.15 m without depending on variation in effective focal length of the entire lens system.

Therefore, in the zoom lens of this embodiment, the adjustment of the back focus of the lens system can be easily performed by adjusting an image surface position so as to be approximately constant from the wide-angle end to the telephoto end at the 1.15 m photographing distance.

Figure 13:
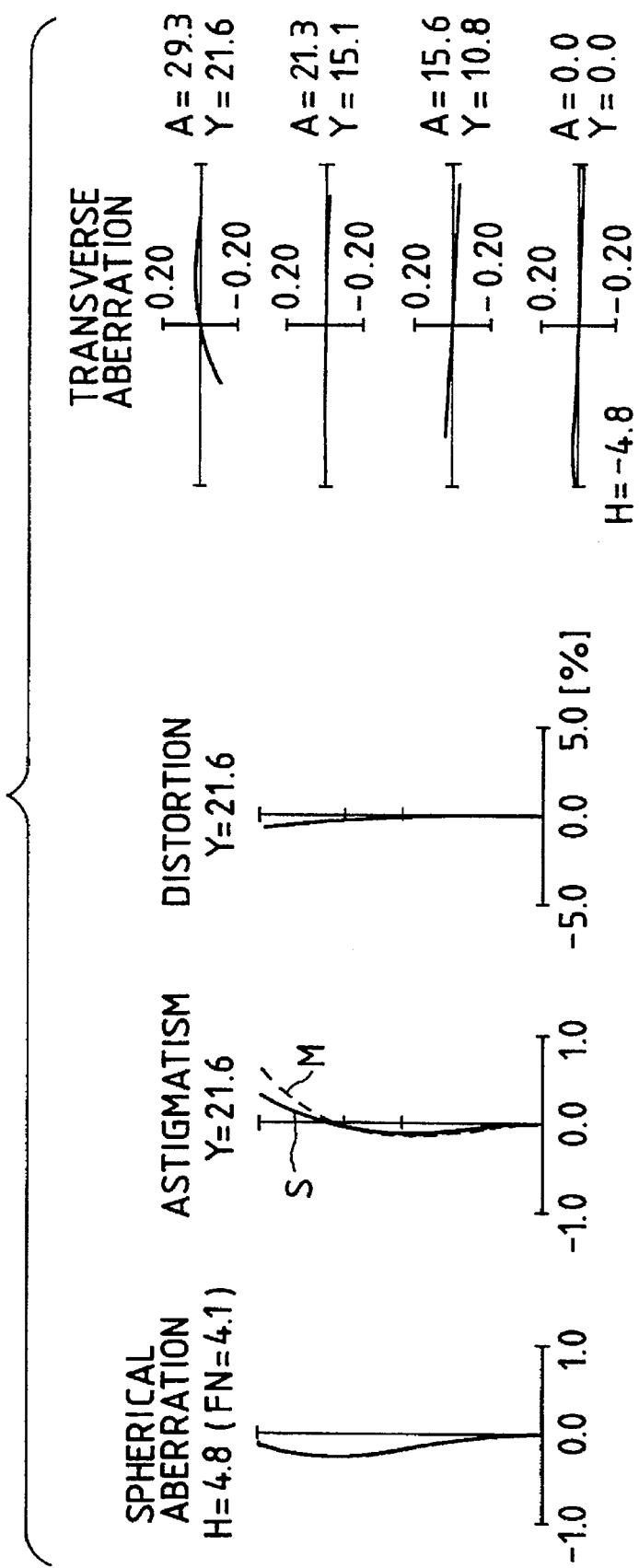
FIG. 13 shows various aberration curves at a wide-angle end (shortest focal length condition) in an infinity focusing condition in the second embodiment.
Figure 14:
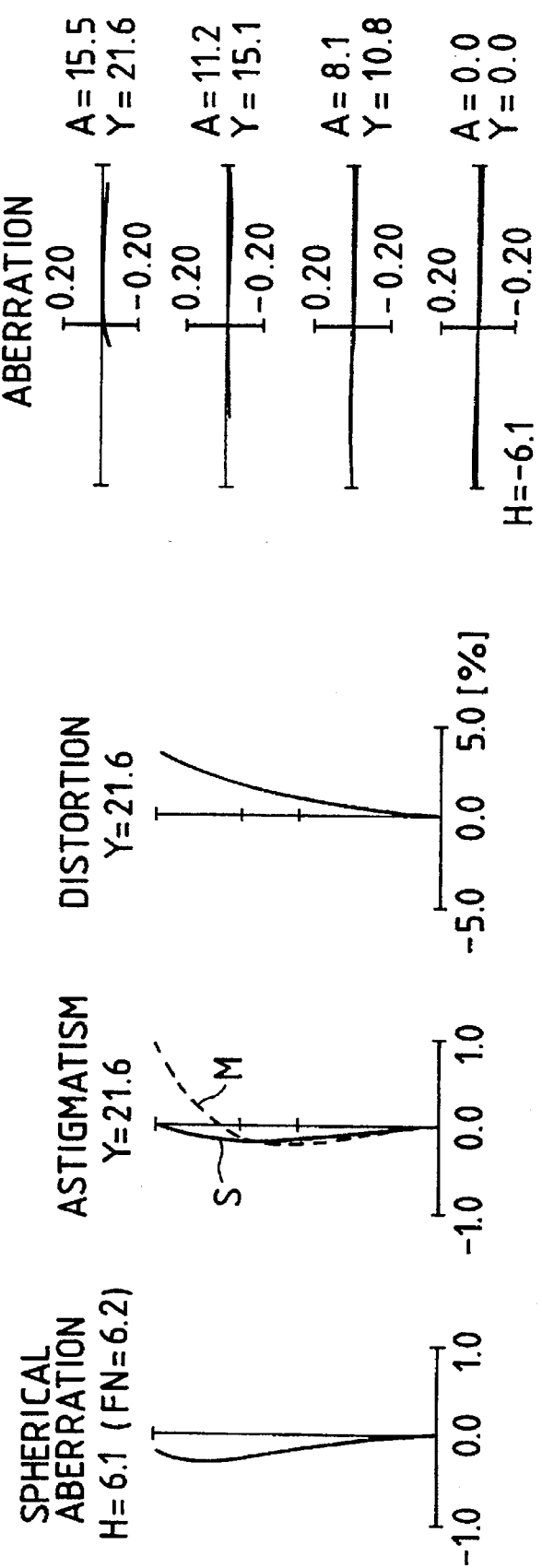
FIG. 14 shows various aberration curves in an intermediate focal length condition in an infinity focusing condition in the second embodiment.
Figure 15:
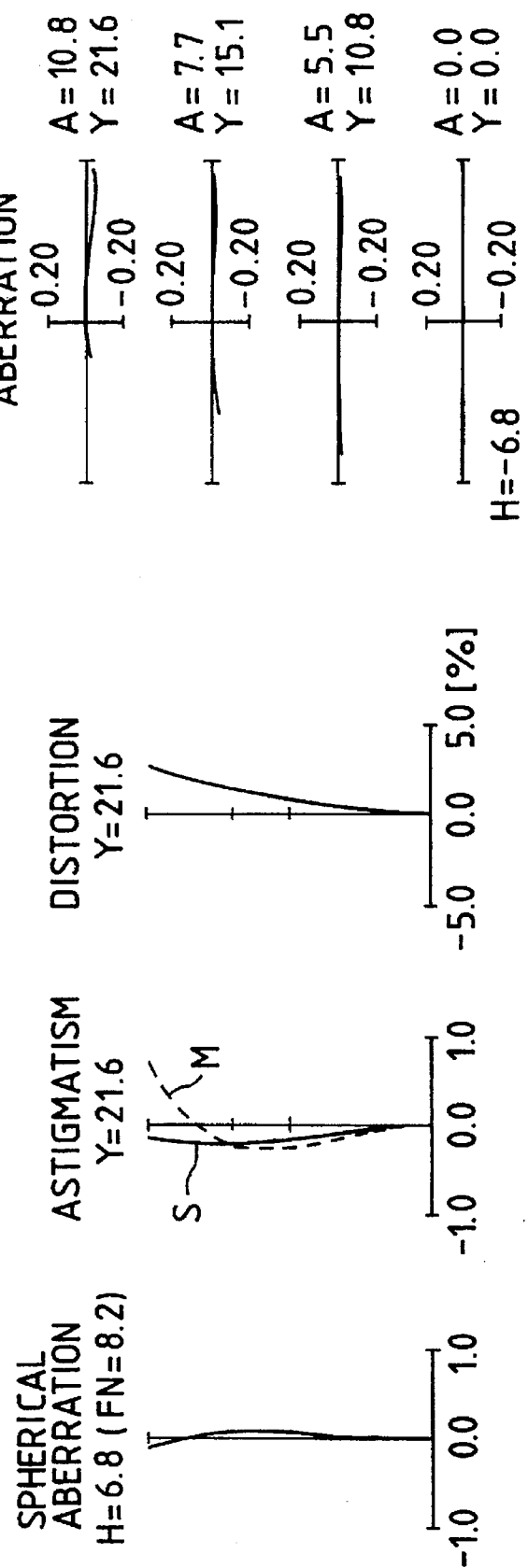
FIG. 15 shows various aberration curves at a telephoto end (longest focal length condition) in an infinity focusing condition in the second embodiment.

FIGS. 13 to 18 show various aberration curves of the second embodiment. FIG. 13 shows various aberration curves at the wide-angle end (shortest focal length condition) in an infinity focusing condition. FIG. 14 shows various aberration curves in an intermediate focal length condition in an infinity focusing condition. FIG. 15 shows various aberration curves at the telephoto end (longest focal length condition) in an infinity focusing condition.

Figure 16:
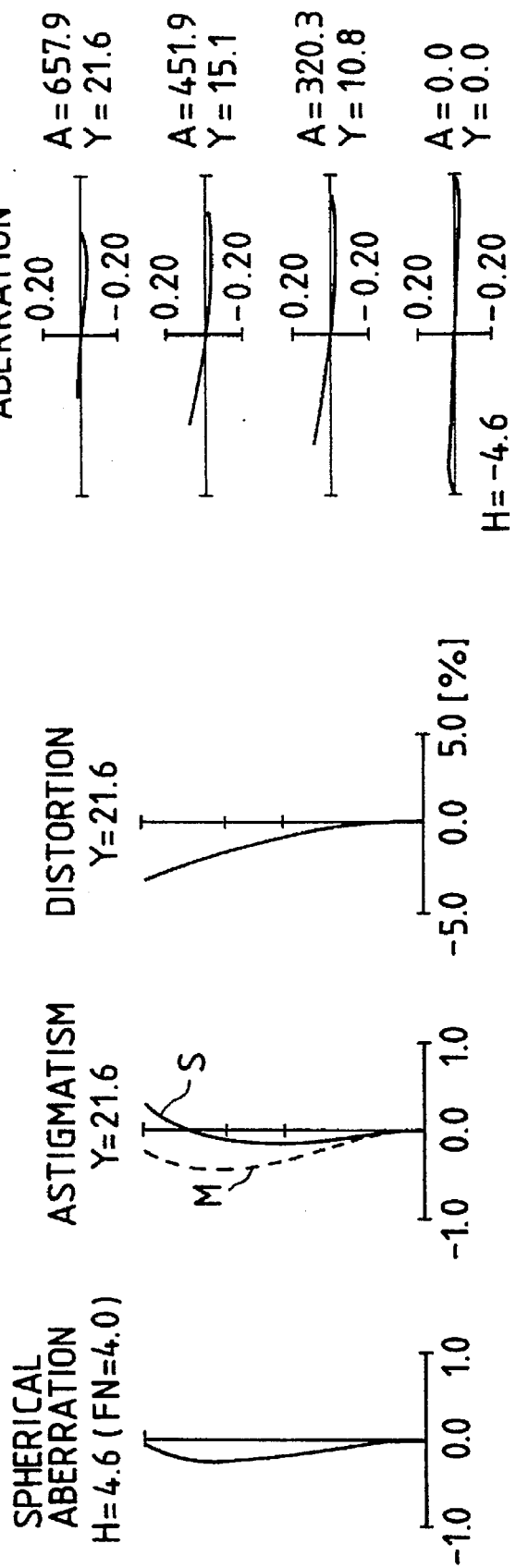
FIG. 16 shows various aberration curves in the intermediate focal length condition in a 1.15 m photographing distance focusing condition in the second embodiment.
Figure 17:
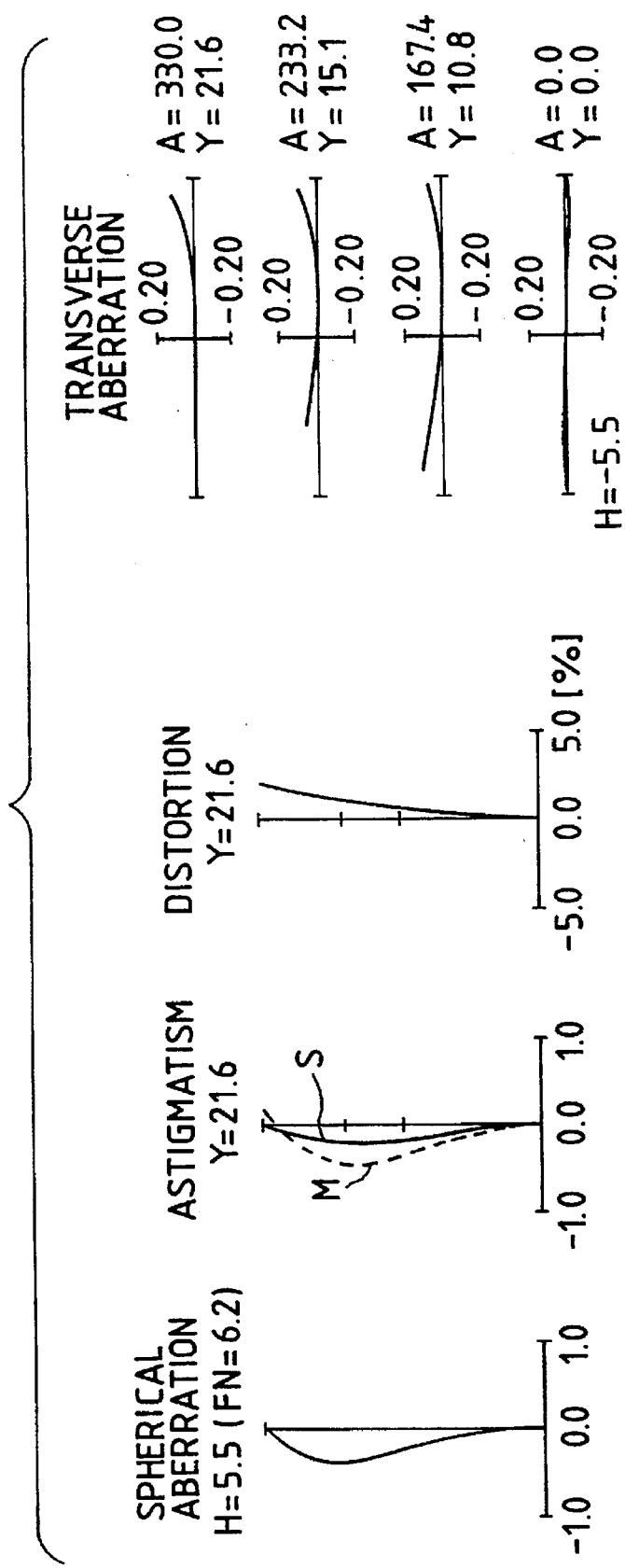
FIG. 17 shows various aberration curves in the intermediate focal length condition in a 1.15 m photographing distance focusing condition in the second embodiment.
Figure 18:
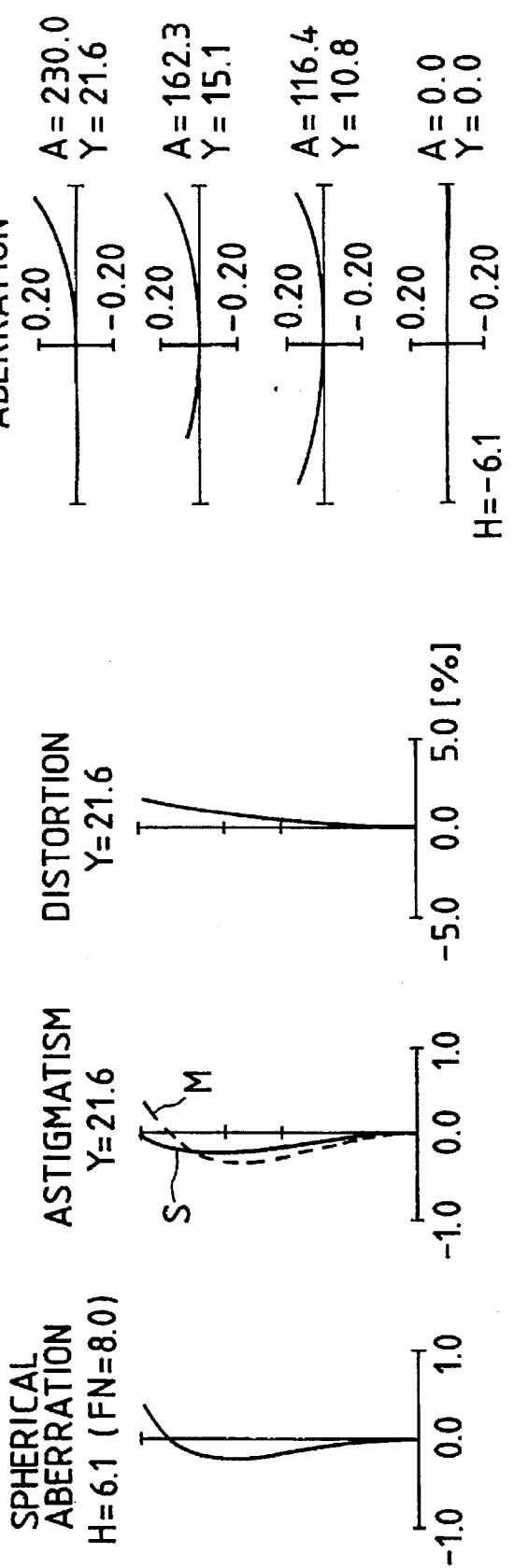
FIG. 18 shows various aberration curves at the telephoto end in a 1.15 m photographing distance focusing condition.

FIG. 16 shows various aberration curves at the wide-angle end in a 1.15 m photographing distance focusing condition. FIG. 17 shows various aberration curves in the intermediate focal length condition in a 1.15 m photographing distance focusing condition. FIG. 18 shows various aberration curves at the telephoto end in a 1.15 m photographing distance focusing condition.

In the aberration curves, FN represents the F-number; H represents the height of incident light; Y represents the height of the image; and A represents the angle of incidence of the principle ray.

Also, in the aberration curves indicating astigmatism, the solid line is the sagittal image surface S and the broken line is the meridional image surface M.

As is apparent from the aberration curves, in this embodiment, various aberrations in the respective focal length conditions are corrected preferably.

Having described preferred embodiments of the present invention, it is to be understood that variations will occur to those skilled in the art within the scope of the appended claims.

What is claimed is:

1. A zoom lens comprising a lens system having lens units including, in order from an object side, at least a first lens unit, a second lens unit, and a third lens unit, wherein one of the lens units of the lens system disposed nearer to an image side than said first lens unit is a variable magnification-focusing lens unit that is shifted along an optical axis to perform a refractive power varying operation from a wide-angle end to a telephoto end and a focusing operation, and an air gap along said optical axis between said variable magnification-focusing lens unit and a lens unit adjacent to said variable magnification-focusing lens unit, when said variable magnification-focusing lens unit is focused on an object, remains approximately constant, irrespective of an effective focal length of said lens system, when said object is at a predetermined finite photographing distance, and said air gap varies, depending on said effective focal length, when said object is at another photographing distance.

2. A zoom lens according to claim 1, wherein the direction of relative movement of said variable magnification-focusing lens unit with respect to said adjacent lens unit in said refractive power varying operation from said wide-angle end to said telephoto end is contrary to the direction of relative movement of said variable magnification-focusing lens unit with respect to said adjacent lens unit in said focusing operation to a near distance object.

3. A zoom lens unit according to claim 2, wherein an amount of forward shift of said variable magnification-focusing lens unit ranging from an infinity photographing distance to a shortest photographing distance increases continuously as said effective focal length of the lens system is varied from said wide-angle end to said telephoto end.

4. A zoom lens according to claim 3, wherein said air gap along said optical axis is varied continuously when shifting said lens units from said wide-angle end to said telephoto end.

5. A zoom lens according to claim 1, wherein said air gap remains approximately constant, irrespective of said effective focal length, only when said object is at said predetermined finite photographing distance.

* * * * *